US009784462B2

(12) United States Patent
Fisekovic

(10) Patent No.: US 9,784,462 B2
(45) Date of Patent: Oct. 10, 2017

(54) MERCHANDISE DISPLAY SYSTEM

(71) Applicant: KONINKLIJKE PHILIPS N.V., Eindhoven (NL)

(72) Inventor: Nebojsa Fisekovic, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 492 days.

(21) Appl. No.: 14/370,575

(22) PCT Filed: Dec. 26, 2012

(86) PCT No.: PCT/IB2012/057728
§ 371 (c)(1),
(2) Date: Jul. 3, 2014

(87) PCT Pub. No.: WO2013/102828
PCT Pub. Date: Jul. 11, 2013

(65) Prior Publication Data
US 2014/0376206 A1 Dec. 25, 2014

Related U.S. Application Data

(60) Provisional application No. 61/583,777, filed on Jan. 6, 2012.

(51) Int. Cl.
F24F 11/00 (2006.01)
G06Q 30/02 (2012.01)
F21V 33/00 (2006.01)
F24D 19/10 (2006.01)

(52) U.S. Cl.
CPC ...... *F24F 11/0034* (2013.01); *F21V 33/0012* (2013.01); *F24D 19/1084* (2013.01); *G06Q 30/02* (2013.01); *F24F 2011/0035* (2013.01)

(58) Field of Classification Search
CPC ............. F24F 11/0034; F21V 33/0012; F24D 19/1084; G06Q 30/02
See application file for complete search history.

(56) References Cited

U.S. PATENT DOCUMENTS 7,665,860 B2  2/2010  Demarest et al.
7,686,217 B2 * 3/2010  Heckel .................. G06Q 30/02
                                        235/375
2002/0186151 A1  12/2002  Greenberg
(Continued)

FOREIGN PATENT DOCUMENTS

CN    1236246 A    11/1999
CN  101918636 A    12/2010
(Continued)

*Primary Examiner* — David V Bruce

(57) ABSTRACT

The present invention relates to an arrangement (10) for a merchandise display system. The arrangement comprises a detector (5) arranged to detect the presence of a person (8) in the proximity of a display region (2) adapted to accommodate a piece of merchandise (3), a temperature adjustment device (4) arranged to adjust the temperature in the proximity of the display region, and a controller (6) configured to, based on the detection, control the temperature adjustment device. The present invention is advantageous in that the temperature difference may contribute to how the piece of merchandise is perceived by the person.

13 Claims, 1 Drawing Sheet

(56) References Cited

U.S. PATENT DOCUMENTS

| | | | |
|---|---|---|---|
| 2003/0001021 A1* | 1/2003 | Mazereeuw | G05D 23/1902 236/47 |
| 2004/0044564 A1 | 3/2004 | Dietz et al. | |
| 2004/0079094 A1 | 4/2004 | Kasai et al. | |
| 2004/0193313 A1* | 9/2004 | Cornet | G09F 27/00 700/231 |
| 2006/0143082 A1* | 6/2006 | Ebert | G06Q 30/02 705/14.72 |
| 2007/0285510 A1 | 12/2007 | Lipton et al. | |
| 2010/0012737 A1 | 1/2010 | Lates | |
| 2010/0120538 A1* | 5/2010 | DeWitt | G07F 17/32 463/42 |

FOREIGN PATENT DOCUMENTS

| | | |
|---|---|---|
| EP | 2147578 B1 | 12/2010 |
| JP | 2008257216 A | 10/2008 |
| JP | 2011146137 A | 7/2011 |
| WO | 2010131170 A1 | 11/2010 |

\* cited by examiner

MERCHANDISE DISPLAY SYSTEM

CROSS-REFERENCE TO PRIOR APPLICATIONS

This application is the U.S. National Phase application under 35 U.S.C. §371 of International Application No. PCT/IB12/057728, filed on Dec. 26, 2012, which claims the benefit of U.S. Provisional Patent Application No. 61/583,777, filed on Jan. 6, 2012. These applications are hereby incorporated by reference herein.

FIELD OF THE INVENTION

The present invention generally relates to the field of merchandise display. In particular, the present invention relates to the field of advertising arrangements for merchandise display systems.

BACKGROUND OF THE INVENTION

Merchandise display systems are used to present products for customers in retail shops and comprise a display region, in which the products are accommodated. The display region may e.g. be a shelf on which merchandise is placed or a cloth rack if the merchandise is clothes. The display region may be located where customers can notice and approach the products, such as inside a shop window or in the actual shop. When the customer has approached the merchandise, he/she will evaluate it and then decide to buy it or not.

SUMMARY OF THE INVENTION

It is an object of the present invention to provide an improved merchandise display system. Further, it is an object of the present invention to provide an arrangement for affecting a person in the proximity of a display region in which a piece of merchandise is accommodated during the evaluation process of the merchandise.

According to a first aspect of the invention, this and other objects are achieved by an arrangement for a merchandise display system. The arrangement comprises a detector arranged to detect the presence of a person in the proximity of a display region adapted to accommodate a piece of merchandise (or product), and a temperature adjustment device arranged to adjust the temperature in the proximity of the display region. The arrangement further comprises a controller configured to, based on the detection, control the temperature adjustment device.

According to a second aspect of the present invention, a method of controlling a temperature in the proximity of a merchandise display system is provided. The method comprises the steps of detecting presence of a person in the proximity of a display region adapted to accommodate a piece of merchandise, and controlling, based on the detection, a temperature adjustment device arranged to adjust the temperature in the proximity of the display region.

The present invention uses the concept of interactive advertising by detecting a person standing in the proximity of a merchandise display region and affecting that person's subjective appreciation of the merchandise being displayed by a local adjustment of (perceived) temperature. When a person approaches the display region, it is detected and the output (such as the heat output and/or cooling output) of the temperature adjustment device is adjusted, whereby the person is able to feel a difference in temperature when standing in front of the piece of merchandise. The present invention is advantageous in that the temperature difference may contribute to how the merchandise is perceived by the person. The perception of the temperature difference may be observed conscious or unconscious by the person and may influence the mindset of the person while evaluating the merchandise. With the present invention, the adjusted output from the temperature adjustment device may influence customers' feelings, as the temperature difference may be perceived as pleasant. The pleasant feeling may in turn influence the person to buy the piece of merchandise. In other words, the present invention is advantageous in that it provides a new type of advertising incorporated in a merchandise display system, the advertising being based on influencing customers's state of mind with respect to a piece of merchandise by a local adjustment of (perceived) temperature (such as by heat and/or cold), which may increase sales for a shop.

Thus, the present invention is advantageous in that it provides an improved arrangement for display of a piece of merchandise. The inventive arrangement includes an advertizing function in the form of a temperature adjustment device which is activated in response to detection of the presence of a person. The advertising function relies on a person feeling warmth and/or cold. Among other things, the inventors have recognized that people's feelings, and thereby their decision to buy, may be influenced from surrounding conditions.

In the present disclosure, the term "merchandise" is to be widely interpreted and may include any product which may be displayed for sale. In addition to actual devices, e.g. marketing material for travels, services and other things of a more non-physical character may be displayed in the display region.

Further, it will be appreciated that the term "person" may be interpreted as any target desirable to detect in the proximity of the display region. For example, the detector may be configured to detect a pet (such as a dog) in the proximity of the display region. The pet may notice the temperature difference and express a notion of like to its owner e.g. by wagging its tail or make a sound and thereby influence the owner to buy the merchandise. Hence, the owner (or the person leading the pet) may be indirectly triggered by the temperature difference and influenced in a buying decision.

According to an embodiment of the present invention, the temperature adjustment device may comprises a heat radiator, which is advantageous in that an increased temperature may be perceived by a person as a pleasant feeling.

In another embodiment, the temperature adjustment device may comprises a cooling device, which is advantageous in that a decreased temperature may be perceived as a refreshing feeling, in particular if the ambient temperature is high, such as on a warm and sunny summer day. The cooling device may e.g. be an air conditioner or a cooling fan.

It will be appreciated that the temperature adjustment device may comprise both a heat radiator and a cooling device.

According to an embodiment of the present invention, the arrangement may be an advertising arrangement. The advertising arrangement may influence the mindset of customers by inducing heat or cold sensations, whereby the sales of the merchandise may increase.

According to an embodiment of the present invention, the controller may be configured to, based on said detection, control the temperature adjustment device to increase, its output. In case of a heat radiator, the heat output may be increased, and in case of a cooling device, the cooling output may be increased. Hence, the person may feel a sensation of warmth or cold when approaching the merchandise. The present embodiment is advantageous in that the person may perceive the warmth or cold sensation as soothing/pleasing/refreshing and thereby associate the piece of merchandise with that feeling. The temperature adjustment device may preferably just slightly increase its output, such that the person perceives just a slight increase or decrease in temperature. If the output is just slightly increased, the person may merely perceive the warmth or cold, i.e. unconsciously, but still associate the merchandise with the feeling of warmth or cold, respectively. Hence, a customer may be unconsciously triggered by the heat or cold during the evaluation process of the piece of merchandise.

Moreover, the adjustment of the output (and the change in temperature) may depend on the type of merchandise and/or the local temperature, which may be measured by a temperature sensor connected to the controller.

In an alternative embodiment, the temperature adjustment device may provide a certain output (such as a certain heat or cold output) while no person is detected, and when a person is detected, the controller may control the temperature adjustment device to decrease its output.

According to an embodiment of the present invention, the controller may be configured to keep the temperature adjustment device (turned/switched) on (i.e. in a heat radiating mode in case of a heat radiator, and in a cooling mode in case of a cooling device) as long as the presence of a person is detected by the detector. Thus, the person will feel the adjusted temperature as long as he/she is in the proximity of the display region. The present embodiment provides energy savings since the temperature adjustment device may be turned off when no person is present in the proximity of the display region. For example, the heat/cooling output may be maintained at the same level as long as the presence of a person is detected by the detector.

According to an embodiment of the present invention, the controller may be configured to, based on said detection, control the temperature adjustment device to provide a heat pulse and/or a pulse of cold. The pulse may e.g. last for 1-5 seconds. The person may then just feel a temperature adjustment when approaching the display region. The present embodiment provides energy savings since the temperature adjustment device may be turned on only for a few seconds.

According to an embodiment of the present invention, the controller may be configured to keep the temperature adjustment device (turned/switched) on for as long as presence of a person is detected by the detector at a predetermined detection frequency (i.e. if a person is detected a predetermined amount of times within a predetermined time interval). Thus, if people pass the display region frequently, e.g. if it is crowded in the shop, the output of the temperature adjustment device may be constant and the need of frequently adjusting the output, e.g. by turning the temperature adjustment device on and off, is reduced, thereby increasing the life time of the heating and/or cooling element which may suffer from repetitive increase and decrease in temperature. For example, the output may be maintained at the same level if presence of a person is detected by the detector at a predetermined frequency.

According to an embodiment of the present invention, the arrangement may further comprise a timer, wherein the controller may be configured to control the temperature adjustment device based on time information provided by the timer. For example, the temperature adjustment device may be controlled to provide an increased output between two time points during the day, and/or for a predetermined time interval after the detection of a person, or the temperature adjustment device may be disabled for specific time periods during the day.

According to an embodiment of the present invention, the arrangement may further comprise a detector adapted to detect the orientation of a person relative to the display region, wherein the controller is configured to, based on the detected orientation, control the temperature adjustment device. The present embodiment is advantageous in that the output of the temperature adjustment device may merely be adjusted when it is detected that a person is turned towards, and thus possibly looking into the display region. Hence, a person standing in the proximity of, but not looking into the display region, and thus, not paying attention to the piece of merchandise, may not actuate a temperature adjustment. Thus, the arrangement according to the present embodiment has improved energy efficiency since less heat and/or cold is output (i.e. unnecessary output of the temperature adjustment device is avoided). The detector may e.g. be a face detector able to detect a face of a person or a motion detector capable of detecting the walking/motion direction of a person.

According to an embodiment of the present invention, a merchandise display system is provided. The merchandise display system may comprise a display region arranged to accommodate a piece of merchandise, and an arrangement as defined in any one of the preceding embodiments. The present embodiment is advantageous in that the merchandise display system is able to detect a person standing in the proximity of the display region, inducing a temperature change sensation at the person (such as by heat radiation or cooling) and thereby influencing the person's mindset towards the merchandise displayed.

In an embodiment, the temperature adjustment device may be arranged to provide a temperature adjustment in a region from which the piece of merchandise is visible to a person, which is advantageous in that the person may feel the temperature difference while watching the piece of merchandise and without being close to the merchandise.

According to an embodiment of the present invention, a lighting system for illuminating a merchandise display system may be provided. The lighting system may comprise an arrangement as defined in any one of the preceding embodiments.

It is noted that the invention relates to all possible combinations of features recited in the claims. Further, it will be appreciated that the various embodiments described for the arrangement are all combinable with the method as defined in accordance with the second aspect of the present invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

These and other aspects of the present invention will now be described in more detail, with reference to the appended drawings showing embodiments of the invention.

The figures are schematic, not necessarily to scale, and generally only show parts which are necessary in order to elucidate the invention, wherein other parts may be omitted or merely suggested.

DETAILED DESCRIPTION

Figure 1:
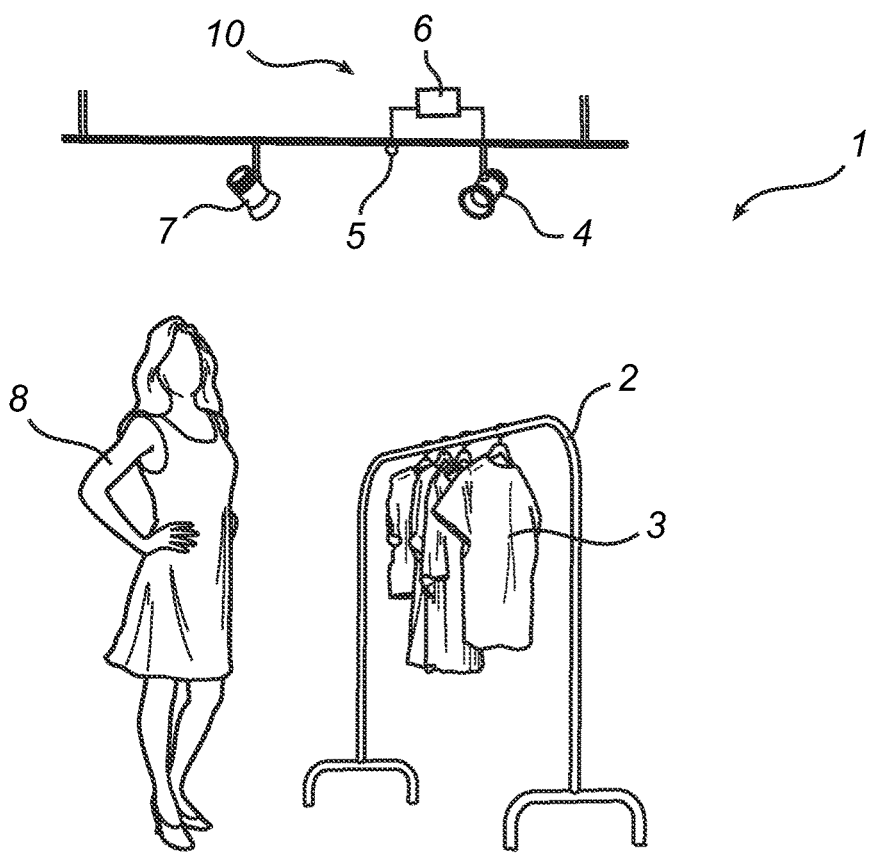
FIG. 1 shows a merchandise display system according to an embodiment of the present invention.

With reference to FIG. 1, a merchandise display system according to an embodiment of the present invention will be described.

FIG. 1 shows a merchandise display system 1 for arrangement in a retail shop. The merchandise display system 1 comprises a display region 2 in which merchandise 3 are accommodated. In the present embodiment illustrated in FIG. 1, the display region 2 comprises a cloth rack and the merchandise 3 are clothes. However, the display region 2 may comprise any region, area, shelf or rack at which one or more pieces of merchandise may be arranged (or located), and the merchandise 3 may be any kind of merchandise, such as retail products or marketing material for travels or services.

The merchandise display system 1 further comprises an advertising arrangement 10. The arrangement 10 may be mounted separately from the rack of the display region 2 (as shown in FIG. 1) or mounted to the rack (or any physical part) of the display region 2 (not shown). The arrangement 10 comprises a temperature adjustment device 4, such as a heat radiator arranged to provide heat in the proximity of the display region 2 and the merchandise 3. The heat radiator 4 may be an infrared (IR) heater, such as an IR lamp.

In an embodiment, the temperature adjustment device 4 may be a cooling device, such as an air conditioner or a cooling fan, arranged to cool a region in the proximity of the display region 2 and the merchandise 3. For example, the cooling device may provide cooled air in the proximity of the display region 2. However, in the following, the advertising arrangement 10 will be described with a heat radiator 4 as an illustrating example. It will be appreciated that if a cooling device is used instead of, or as a complement to, the heat radiator 4, terming like "cooling output" is applicable instead of, or as a complement to, terming like "heat output".

The arrangement 10 further comprises a detector 5 arranged to detect the presence of a person 8 in the proximity of the display region 2, such as 1-3 meter from the display region 2. The detection region of detector 5 may be confined to one side of the display region 2, or arranged to surround the display region 2. The detector 5 may e.g. be a movement detector and/or a distance detector. In an embodiment, the detector 5 may be a detector arranged to detect if a person faces the display region, such as a face detector. Further, the arrangement 10 may comprise several detectors of the same or different kind.

The arrangement 10 further comprises a controller 6 configured to receive a detection signal from the detector 5 and to control the heat radiator 4 based on the detection signal. The controller 6 may be arranged in the detector 5, in the heat radiator 4 or as a separate unit, and may comprise a processing means for processing the signal from the detector 5 and provide a control signal to the heat radiator 4. In an embodiment, the arrangement 10 may comprise a timer (not shown) configured to provide the controller 6 with time information, which the controller 6 may use to control the heat radiator 4.

Optionally, the arrangement may further comprising a measuring unit (not shown) configured to count the number of times a person 8 is detected by the detector 5 and store said number, and/or measure for how long a person 8 is detected by the detector and store the measured time. The arrangement 10 may then provide statistic information about how many people have passed the display region 2 and for how long the persons have been in the proximity of (and possibly looking into) the display region 2.

In an embodiment, the merchandise display system 1 may comprise a lighting arrangement 7 for illuminating the display region 2 and thereby the merchandise 3. Optionally, the arrangement 10 may be comprised in (or incorporated in) the lighting arrangement 7 or vice versa.

Figure 2:
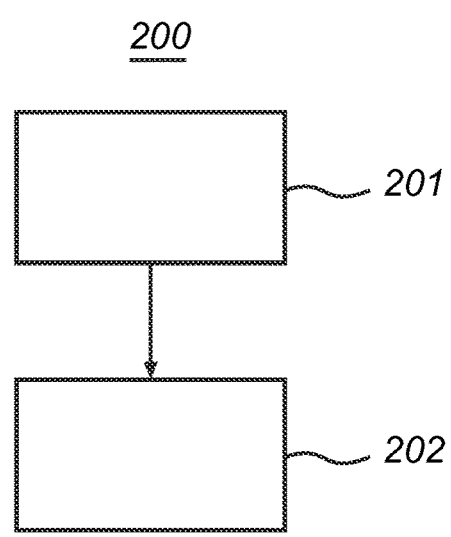
FIG. 2 shows a method of controlling temperature adjustment for merchandise display according to an embodiment of the present invention.

In the following, the function of the merchandise display system 1 and a method 200 of controlling the temperature adjustment provided by the arrangement 10 according to an embodiment of the invention will be described with reference to FIGS. 1 and 2.

Preferably, the initial mode of the heat radiator 4 is to provide zero heat output, i.e., the heat radiator 4 is off. Alternatively, the heat radiator 4 may in the initial mode provide a continuous (preferably low) heat output. When a person 8 approaches the display region 2, the detector 5 detects in step 201 the presence of the person 8 and provides a detection signal based on the detection to the controller 6. In response to the detection in step 201, the controller 6 controls in step 202 the heat radiator 4 to adjust its heat output, e.g. by simply turning the heat radiator 4 on, and/or bring it to slightly increase its heat output. The heat output may remain increased e.g. as long as the detector 5 detects presence of the person 8 in the proximity of the display region 2, and/or for a predetermined time period (such as 1 min). Alternatively, the heat radiator 4 may provide an increased heat output for just a short time period (i.e. a heat pulse). The person 8 will feel the slight temperature increase as a subtle touch of warmth while evaluating the merchandise 3. Hence, the person's feeling of comfort and well-being is influenced while viewing (or inspecting) the merchandise prior to making the decision to buy. The experience of a subtle touch of warmth may also evoke memories or longings associated with the merchandise being viewed and therewith influencing the decision process to buy the merchandise. Thus, the arrangement 10 may encourage the person to buy the merchandise looked at by strengthening the person's feelings for the merchandise.

For example, the merchandise 3 may be a winter coat, and as the person (preferably unconsciously) senses the warmth from the heat radiator 4, he/she perceives a warm feeling, which he/she associates with the winter coat, thereby assisting the person in his/her buying decision (i.e. the person 8 may be tempted to buy the winter coat). When the person 8 leaves the display region 2, the controller 6 may preferably control the heat radiator to turn the heat off or at least decrease the heat output to save energy.

According to another exemplifying embodiment (not shown), the merchandise display system may be provided in a shop window and the merchandise may be marketing material for travels to sunny and warm resorts. The detector may then be arranged do detect the presence of persons, and the heat radiator may be arranged to provide heat, outside and in the proximity of the shop window, such that persons approaching the shop window will perceive warmth while looking at the marketing material.

It will be appreciated that the above described function of the advertising arrangement also is applicable if the temperature adjustment device comprises a cooling device, but the arrangement may then impact on the person's state of mind by means of cooling.

The person skilled in the art realizes that the present invention by no means is limited to the preferred embodiments described above. On the contrary, many modifications and variations are possible within the scope of the appended claims.

The invention claimed is:

1. An arrangement for a merchandise display system, said arrangement comprising:
    a detector arranged to detect the presence of a person in the proximity of a display region adapted to accommodate a piece of merchandise,
    a temperature adjustment device arranged to adjust the temperature in the proximity of the display region, and
    a controller configured to, based on said detection, control the temperature adjustment device, wherein the arrangement is incorporated in the merchandise display system,
    wherein the controller is configured to, based on said detection, control the temperature adjustment device to provide a heat pulse and/or a pulse of cold.

2. An arrangement as defined in claim 1, wherein the temperature adjustment device comprises a heat radiator.

3. An arrangement as defined in claim 1, wherein the temperature adjustment device comprises a cooling device.

4. An arrangement as defined in claim 1, wherein the arrangement is an advertising arrangement.

5. An arrangement as defined in claim 1, wherein the controller is configured to, based on said detection, control the temperature adjustment device to adjust its output depending on the type of merchandise.

6. An arrangement as defined in claim 1, wherein the controller is configured to keep the temperature adjustment device on as long as the presence of a person is detected by the detector.

7. An arrangement as defined in claim 1, wherein the controller is configured to keep the temperature adjustment device on if presence of a person is detected by the detector at a predetermined detection frequency.

8. An arrangement as defined in claim 1, further comprising a timer, wherein the controller is configured to control the temperature adjustment device based on time information provided by the timer.

9. An arrangement as defined in claim 1, comprising a detector adapted to detect the orientation of a person relative to the display region, wherein the controller is configured to, based on the detected orientation, control the temperature adjustment device.

10. A merchandise display system comprising:
    a display region arranged to accommodate a piece of merchandise, and an arrangement as defined in claim 1.

11. A merchandise display system as defined in claim 10, wherein the temperature adjustment device is arranged to provide a temperature adjustment in a region from which the piece of merchandise is visible to a person.

12. A lighting system for illuminating a merchandise display system, the lighting system comprising an arrangement as defined in claim 1.

13. A method of controlling temperature adjustment for a merchandise display system, the method comprising the steps of:
    detecting presence of a person in the proximity of a display region adapted to accommodate a piece of merchandise, and
    controlling, based on said detection, a temperature adjustment device arranged to adjust the temperature in the proximity of the display region, wherein the adjustment of the temperature depends on the type of merchandise, and wherein controlling the temperature adjustment device comprises providing a heat pulse and/or a pulse of cold.

* * * * *